United States Patent [19]
Audiffred et al.

[11] 3,710,570
[45] Jan. 16, 1973

[54] OIL FILM BEARING FOR CONVERTER ELEMENT

[75] Inventors: Sidney J. Audiffred; Howard C. Steury, both of Washington, Ill.

[73] Assignee: Caterpillar Tractor Co., Peoria, Ill.

[22] Filed: Aug. 30, 1971

[21] Appl. No.: 175,950

[52] U.S. Cl..................60/54, 60/DIG. 5, 308/121
[51] Int. Cl..............................................F16h 33/00
[58] Field of Search......60/54, DIG. 5; 192/3.3, 3.33; 308/121

[56] References Cited

UNITED STATES PATENTS

| | | | |
|---|---|---|---|
| 2,796,736 | 6/1957 | Jandasek | 60/54 |
| 3,079,756 | 3/1963 | Farrell | 60/54 |

*Primary Examiner*—Edgar W. Geoghegan
*Attorney*—Charles M. Fryer et al.

[57] ABSTRACT

One of two relatively rotatable elements of a torque converter is supported by an oil film bearing therebetween. In particular, the secondary pump element of a dual pump torque converter is controllably slipped on the primary pump element as supported by an oil film bearing and special axial retention means including a friction clutch.

12 Claims, 1 Drawing Figure

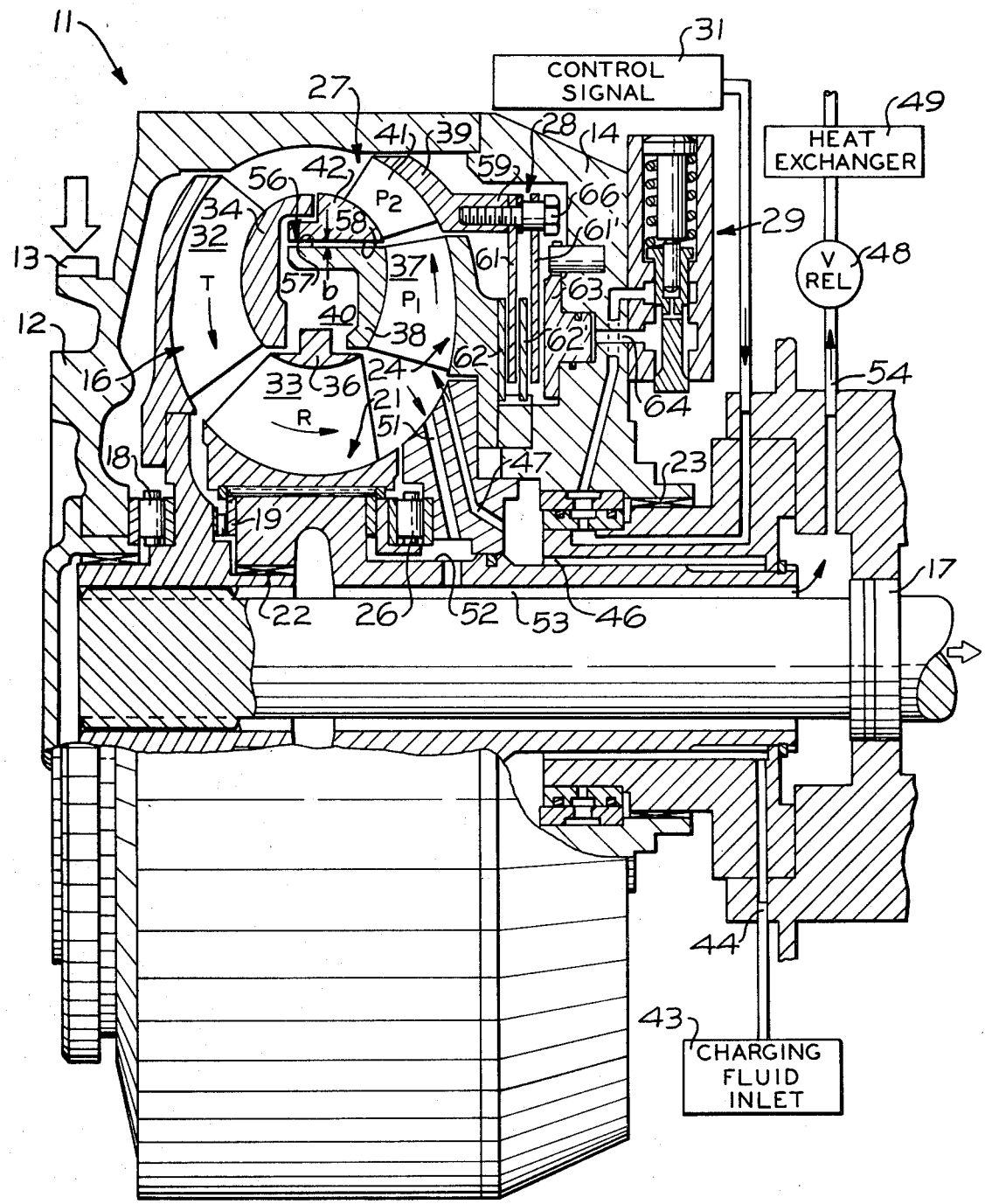

OIL FILM BEARING FOR CONVERTER ELEMENT

BACKGROUND OF THE INVENTION

In a conventional three-element torque converter which includes a pump or impeller member coupled to an input shaft, a turbine member coupled to an output shaft, and a reactor or stator member appropriately directing hydraulic charging oil between the pump and turbine members, support bearings for the rotating pump and turbine members are relatively inexpensive due to the small bearing diameters required. For example, given a torque converter design which is approximately 16 inches at the maximum outside diameter, it would be expected that none of the supporting friction bearings would exceed 4 inches in diameter.

However, in torque converters with a fourth element, for example a dual pump converter with a secondary pump member which is located outboard of the primary pump member, it will be appreciated that radial and axial support of a member this large involves a bearing of extremely large diameter. For example, if the previously noted 16 inch diameter converter included a secondary pump member, the support bearing therefor would be in the order of 12 inches in diameter or larger. Such a bearing is expensive, not only due to its size, but due to a requirement in the construction to resist loading from two directions while providing an anti-friction rotational function.

Although oil film bearings have been employed with other rotating members of a torque converter, such as between the turbine and reaction members, they have generally failed due to friction and wear caused from high relative surface speeds between one member and the other. Even in cases where special bearing surfaces are inserted into the relatively soft aluminum or equivalent metallic filaments or blade rings of such members, failure has occurred due to high relative rotational speeds. In addition, it has been the usual practice to design special shoulders on the ends of such an insert bearing in order to provide an axial retention for the rotating member, thereby adding complexity to the insert.

Accordingly, despite their relatively high cost, it has been the usual practice to utilize large diameter friction bearings to support the outboard secondary pump member of a dual pump torque converter. This bearing holds the secondary pump member axially rigid to the first pump member such that special considerations must be taken in the area of the associated hydraulically actuated slip control clutch for axial movement of the actuator piston. These considerations usually require an internal spline or slots on the lateral extension of the secondary pump member and mating splines or tangs on the reaction plates in the clutch, thereby further contributing to the overall expense of the converter.

SUMMARY OF THE INVENTION

The general object of the present invention is to overcome the previously noted disadvantages and limitations encountered in the support of the secondary pump member of a dual pump torque converter by providing an improved relatively inexpensive arrangement wherein the secondary pump member is controllably slipped on the primary pump member by means of an oil film bearing and special axial retention means including a friction clutch for controlling the relative slip between the pump members.

Another object of the invention is the provision of an oil film bearing defined between a machined bore on the inner diameter of the blade ring of the secondary pump member and a machined turn on the outer diameter of the blade ring of the primary pump member of a dual pump torque converter, which bearing is supplied by the converter charging oil and has a circulating volume for purposes of cooling.

Still another object of the invention is to provide an oil film bearing arrangement of the class described wherein at least one clutch disc directly secured to the secondary pump member shell extends inboard for engagement in an annular rotating friction clutch carried by the primary pump member to thereby axially retain the secondary pump member.

It is a further object of the invention to provide a bearing arrangement of the type hereinbefore described wherein the total axial displacement of the secondary pump member relative to the primary pump member is a function of the normal disengagement slip allowance in the friction clutch.

BRIEF DESCRIPTION OF THE DRAWING

The single FIGURE is a broken-away cross sectional view of a dual pump torque converter embodying an oil film bearing in accordance with the present invention.

DETAILED DESCRIPTION OF THE PREFERRED EMBODIMENT OF THE INVENTION

Referring now to the drawing in detail there is shown a four-element dual pump torque converter 11 including an input member 12 which is adapted to be rotatably driven by an engine flywheel (not shown) on an integral spline 13. The input member shrouds the major portion of the internal parts of the converter, extending longitudinally to an annular cover 14 integrally secured thereto.

A conventional turbine member 16 is disposed interiorly of the input member and splined to an output shaft 17 extending coaxially through the bore of cover 14 in radially inwardly spaced relation thereto. The turbine is held against axial thrust in one direction by means of a needle bearing 18 between the turbine and end wall of the input member 12, and against axial thrust in the opposite direction by means of a needle bearing 19 between the turbine and a conventional grounded or stationary reactor member 21.

The reactor member 21 extends coaxially through the bore of the cover 14 in outwardly radially spaced relation to output shaft 17 and provides an internal bearing 22 at its leftward end for support of the turbine member and output shaft. The reactor member also provides an external bearing 23 at its rightward end for support of the cover 14. Thus, the combination of the input member 12 and cover 14 and combination of the turbine member 16 and output shaft 17 are respectively independently rotatable with respect to reactor member 21.

A primary pump member 24 is disposed within input member 12 and integrally secured to cover 14 so as to be rotatable therewith. The pump member is retained against axial thrust as by means of needle bearing 26 interposed between the pump member and reactor member 21. A secondary pump member 27 is also disposed within the input member outboard of the primary pump member in relative rotational relationship thereto.

A slipping clutch 28 operatively associated with the primary and secondary pump members determines the amount of rotational slip therebetween in accordance with clutch engagement between full lock and full slip conditions as controlled for example by a speed sensitive valve 29 carried by cover 14 and associated maximum limit manual reducing valve 31 of the variety disclosed in copending application Ser. No. 86,793 filed Nov. 4, 1970.

The turbine member 16 and reactor member 21 respectively include blade cascades 32 and 33 and blade rings 34 and 36. Similarly, the primary pump member 24 is provided with blading 37 inwardly terminating in a blade ring 38, while secondary pump member 27 comprises a shell 39, blade cascade 41 of relatively small blading, and a blade ring 42. The blading angle of secondary pump cascade 41 is complimentary with primary pump cascade 37 such that the relative speeds between the pump members is never high even at full slip.

In order to supply charging oil to the converter 11, a charging fluid inlet 43 is communicated with a conduit 44 in reactor member 21, in turn communicating with an annular passage 46 provided therein. Passage 46 communicates with a passage 47 through primary pump member 24 which terminates in the reaction chamber defined interiorly of the input member 12. The oil is therein circulated counterclockwise, as indicated by the arrows in the FIGURE, and returned to a relief valve 48 and heat exchanger 49 by way of a primary pump member passage 51, reactor member passage 52, the reactor member core 53, and a reactor member conduit 54.

It will be appreciated that the dual pump torque converter 11 to the extent described to this point is generally conventional. The torque supplied to the input member 12 is transmitted to output shaft 17 in accordance with the hydraulic interaction between the pump members 24 and 27, and turbine member 16. Consequently, the amount of torque transmitted or absorbed is a function of the slip between the primary and secondary pump members which in turn is governed by the action of valves 29 and 31 in engaging the clutch 28.

However, with a conventional dual pump converter, the outer secondary pump member is supported on the primary pump member by means of a ball bearing between the blade rings of the respective members which holds same axially rigid with respect to each other. Aside from the relatively great expense of such a large diameter bearing, the attendent axial rigidity of the secondary pump member requires added design complexity in the slipping clutch to accommodate the axial movement of the actuator piston thereof. In this regard, provision must be made for limited axial movement of the clutch discs associated with the secondary pump member as well as those associated with the primary pump member.

The foregoing difficulties are overcome in accordance with the particularly salient aspects of the present invention which generally provides an oil film bearing 56 supporting the secondary pump member 27 for rotation about primary pump member 24, and axial retention of the secondary pump member by means of the slipping clutch 28. Since axial retention of the secondary pump member is provided by the clutch rather than an axially rigid bearing means, clutch discs associated with the secondary pump member need not be axially movable.

More particularly, the oil film bearing 56 is preferably defined between the blade rings 38 and 42 of primary and secondary pump members 24 and 27 by a machined turn 57 on the former and a machined bore 58 on the latter. An inherent pressure difference between the blade cascades 37 and 41 and the inner core cavity 40 generates a continuous supply of cooling oil to the bearing surfaces. The cooling flow provides not only a resistance to the relatively light radial loads on the secondary pump member, but also dissipates heat caused by the low relative rotation between the two pump members.

A lateral extension 59 of secondary pump member shell 39 is provided with a flat face for fixed securance of at least one annular friction disc 61 of slipping clutch 28. Disc 61 extends radially inwardly to a position of slipping engagement with at least one annular clutch disc 62 secured to primary pump member 24.

A hydraulic actuator piston 63 of the clutch is reciprocably mounted at the interior face of cover 14 on the opposite side of disc 61 from disc 62. The piston is interiorly communicated with an outlet port valve 29 via a passage 64 through the cover such that the piston is hydraulically actuated under the control of this valve and valve 31 for axial movement, producing frictional engagement between discs 61 and 62. The clutch, as controlled by the valves, thereby determines the amount of rotational slip between the primary and secondary pump members.

Although one set of clutch discs 61 and 62 may be satisfactorily employed with actuator piston 63, in the illustrated case a second set of discs 61' and 62' are included. Disc 61' is secured to extension 59 of the secondary pump member and extends inwardly into engagement with the acting face of piston 63. The disc 61' may be axially movable relative to the secondary pump member as by slidable mounting of the disc on collars of bolts 66 secured to the pump member.

Disc 62' is secured to the primary pump member at a position interposed between the discs 61 and 61'. Disc 62' is splined to the primary pump member for axial movement relative thereto. Thus, when the piston is extended, the interleaved discs 61, 61', 62, 62' are engaged. In any event, the total axial displacement of the secondary pump member relative to the primary pump member is a function of the normal disengagement slip allowance in the clutch.

It is of importance to note that inasmuch as the relative speed between the primary and secondary pump members is always relatively low due to the complementary blading angles thereof, where on the bearing surfaces 57 and 58 of oil film bearing 56 as machined in the parent metal of the blade rings 38 and 42 is of relatively low order. However, the bearing surfaces may be coated with low friction plastic, such as tetrafluoroethylene, if desired to further reduce wear and substantially eliminate any form of scuffing that may occur therebetween.

It should be further noted that the running clearance $b$ between the surfaces 57 and 58 of bearing 56 is preferably of the order of 0.00075 inches per inch of diameter. Thus, for example, the bearing for a 12 inch running diameter preferably has a running clearance $b$ of 0.009 inches.

Although the invention has been hereinbefore described and illustrated in the accompanying drawing with respect to a single preferred embodiment, it will be appreciated that various modifications and changes may be made therein without departing from the true spirit and scope of the invention, and thus it is not intended to limit the invention except by the terms of the appended claims.

We claim:

1. In a torque converter having at least a stationary reactor member, a turbine member rotatable relative to said reactor member, a primary pump member rotatable relative to said reactor member, a secondary pump member disposed outboard of said primary pump member for rotation thereabout, rotatable input means coupled to said primary pump member for rotation therewith and shrouding said primary pump member, secondary pump member, turbine member, and reactor member to define a chamber containing same, rotatable output means coupled to said turbine member for rotation therewith, means for circulating hydraulic charging oil through said chamber, and clutch means coupling said primary and secondary pump members for controlling rotational slip therebetween, the improvement comprising means defining an oil film bearing between said primary and secondary pump members supporting said secondary pump member for rotation about said primary pump member, and axial retention means including said clutch means for axially retaining said secondary pump member relative to said primary pump member.

2. The combination of claim 1, further defined by said primary pump member including a blade cascade inwardly terminating in a blade ring, said secondary pump member including a shell coaxially disposed about said primary pump member with a blade cascade inwardly terminating in a blade ring coaxially disposed about said blade ring of said primary pump member, said oil film bearing being defined by a machined turn on said blade ring of said primary pump member and a machined bore on said blade ring of said secondary pump member, said charging oil in said chamber being continuously circulated to the surfaces of said turn and bore.

3. The combination of claim 1, further defined by said clutch means comprising at least one first annular friction disc fixedly secured to said secondary pump member and extending radially inward therefrom towards said primary pump member, at least one second annular friction disc secured to said primary pump member at a position engageable with said first disc, and a hydraulic actuator piston mounted for hydraulically actuated axial movement productive of frictional engagement between said first and second discs.

4. The combination of claim 1, further defined by said oil film bearing having surfaces coated with low friction plastic.

5. The combination of claim 1, further defined by said oil film bearing having surfaces with a running clearance therebetween of the order of 0.00075 inches per inch of bearing diameter.

6. The combination of claim 2, further defined by said clutch means comprising at least a first annular friction disc coaxially secured to the outer peripheral portion of said primary pump member, a hydraulic actuator piston carried by said primary pump member and hydraulically axially movable towards and away from said first friction disc, and at least a second annular friction disc fixedly secured to a lateral extension of said shell of said secondary pump member, said second disc extending radially inward to a position intermediate said first disc and piston for engagement therewith.

7. The combination of claim 2, further defined by the surfaces of said machined turn and bore being coated with low friction plastic.

8. The combination of claim 2, further defined by the surfaces of said machined turn and bore having a running clearance therebetween of the order of 0.00075 inches per inch of bearing diameter.

9. The combination of claim 8, further defined by said surfaces being coated with low friction plastic.

10. The combination of claim 6, further defined by the surfaces of said machined turn and bore having a running clearance therebetween of the order of 0.00075 inches per inch of bearing diameter.

11. The combination of claim 10, further defined by said surfaces being coated with low friction plastic.

12. The combination of claim 2, further defined by said clutch means comprising a first plurality of annular friction discs coaxially secured to the outer peripheral portion of said primary pump member, said first plurality of discs being axially movable relative to said primary pump member, a second plurality of annular friction discs secured to a lateral extension of said shell of said secondary pump member, at least one of said second plurality of discs being fixedly secured to said secondary pump member and the remainder thereof being axially movable relative thereto, said second plurality of discs extending radially inward into interleaved relation with said first plurality of discs, and a hydraulic actuator piston carried by said primary pump member and hydraulically axially movable towards and away from said interleaved discs.

* * * * *